(12) United States Patent
Safavi

(10) Patent No.: US 8,325,858 B2
(45) Date of Patent: Dec. 4, 2012

(54) ESTIMATION OF NOISE VARIANCE COMBINED WITH NARROW-BAND INTERFERENCE DETECTION

(75) Inventor: Saeid Safavi, San Diego, CA (US)

(73) Assignee: Entropic Communications, Inc., San Diego, CA (US)

(*) Notice: Subject to any disclaimer, the term of this patent is extended or adjusted under 35 U.S.C. 154(b) by 889 days.

(21) Appl. No.: 12/341,920

(22) Filed: Dec. 22, 2008

(65) Prior Publication Data
US 2010/0158171 A1 Jun. 24, 2010

(51) Int. Cl.
*H03D 1/04* (2006.01)
(52) U.S. Cl. ........ 375/346; 375/148; 375/227; 375/228; 375/340; 375/342; 455/226.3; 455/278.1; 455/296
(58) Field of Classification Search .......... 375/148, 375/224, 227–229, 316, 346, 340, 342, 348; 455/63.1, 67.11, 67.13, 226.1, 226.2, 226.3, 455/226.4, 278.1, 296
See application file for complete search history.

(56) References Cited

U.S. PATENT DOCUMENTS

| | | | | |
|---|---|---|---|---|
| 7,103,316 | B1* | 9/2006 | Hall | 455/63.1 |
| 7,352,730 | B2* | 4/2008 | Ghosh et al. | 370/338 |
| 7,653,035 | B2* | 1/2010 | Lin et al. | 370/338 |
| 7,792,226 | B2* | 9/2010 | Yu et al. | 375/346 |
| 8,059,768 | B2* | 11/2011 | Zhao et al. | 375/346 |
| 2006/0093074 | A1* | 5/2006 | Chang et al. | 375/340 |

* cited by examiner

*Primary Examiner* — Sam K Ahn
*Assistant Examiner* — Sophia Vlahos
(74) *Attorney, Agent, or Firm* — Bruce Greenhaus; Sheppard, Mullin, Richter & Hampton LLP

(57) ABSTRACT

Method and apparatus are provided for estimating noise variance using a long-term data aided algorithm and an interference variance using a short-term data aided algorithm. Using these estimations, an interference hypothesis may be determined. Some embodiments compute the variance for a decision directed noise sample, convert the variance for the decision directed noise to a true noise variance per packet, and convert the variance for the decision directed noise to a true noise variance per symbol. The interference hypothesis may be based on the noise variance estimations per symbol and the noise variance estimation per packet. Some embodiments determine the presence of noise based on a comparison of the noise variance per packet, the noise variance per symbol, and each hypothesis and compute the long-term noise variance. Using the long-term noise variance in place of the variance for a decision directed noise sample for a subsequent determination of interference.

10 Claims, 9 Drawing Sheets

ESTIMATION OF NOISE VARIANCE COMBINED WITH NARROW-BAND INTERFERENCE DETECTION

TECHNICAL FIELD

This disclosure relates to communication networks, and at least some of the examples disclosed herein relate more particularly, to noise variance estimation.

DESCRIPTION OF THE RELATED ART

In digital communications, various types of error correcting codes may be used to decrease information loss over a communication channel. Some examples of error correcting codes include low-density parity-check codes, turbo codes, and turbo product codes. These error-correcting codes may be used to transmit a message over a noisy transmission channel. While low-density parity-check codes and other error correcting codes cannot guarantee perfect transmission, the probability of lost information can be decreased. In some example systems, error correction codes may be used in communications systems designed to achieve high information transfer over a limited-bandwidth communication link in the presence of data-corrupting noise.

Low-density parity check codes and other concatenated codes (e.g. turbo codes and turbo product code) can achieve near Shannon capacity limits with moderate complexities. These techniques use one or more component codes, and separate decoders to estimate the a posteriori probability of various message bits. These estimates in turn become a priori information to the other decoder, which further updates the a posteriori estimates. In some examples, a decoding algorithm may be used to estimate the a posteriori probabilities of the various message bits. The algorithm may compute channel signal-to-noise ratio or noise variance for a Gaussian noise channel and this information can be used to estimate the probabilities of the message bits. These probabilities may be used to determine prior bit statistics in order to compute the log-likelihood ratios. The likelihood ratio is the ratio of the maximum probability of a result under two different hypotheses.

In addition to performance enhancement in additive white Gaussian noise, in some applications, channel coding in Orthogonal Frequency Division Multiplexing (OFDM) systems may be used to provide extra immunity in the presence of narrow-band interference. In these scenarios, interference detection or estimation of the instantaneous interference power or variance can be used for correct computation of the log-likelihood ratios for sub-carriers that are hit by narrow-band interference. When the interference power is comparable to the sub-carriers powers, the interference power can be computed and added to the noise variance on a per sub-carrier basis. On the other hand, for large levels of interference, (interference levels over 10 dB above sub-carrier power in OFDM systems) estimation of the log-likelihood ratio is not required since it would not improve the bit error rate performance. In these scenarios, it is only sufficient to provide the coding with complete uncertainty (0 log-likelihood ratio) for portion of system bandwidth that is bit by the interference.

One example of a wired OFDM scheme is the system defined by the Multimedia over Coax Alliance (MoCA®). In a MoCA system, coaxial cables are used to connect components of the network, such as antennas, TVs, set top boxes and radios, and generally, to distribute multimedia signals throughout a home or building. MoCA systems are generally used to allow such entertainment devices within a home network to communicate with one another and share data, including multimedia data, such as television shows, movies, internet data, music, video clips, etc. One advantage of such MoCA systems is that new home wiring might be avoided because many homes already have adequate coaxial wiring installed. MoCA systems are typically used to distribute high-quality multimedia content and high-speed data with throughput exceeding 100 megabits per second.

MoCA devices generally communicate with one another in the 1 GHz microwave band using OFDM modulation. The OFDM modulated signals used by MoCA are communicated over MoCA channels using a frequency-division multiplexing. In MoCA systems that use OFDM, each MoCA channel is formed from one of a large number of closely spaced orthogonal sub-carriers. These MoCA channels are typically used to carry data. Each sub-carrier is typically modulated with a conventional modulation scheme at a low symbol rate, maintaining total data rates similar to conventional single-carrier modulation schemes in the same bandwidth. Some example modulations include Quadrature Amplitude Modulation (QAM) or phase shift keying (PSK) modulation.

In a digital communication system, such as a MoCA system, coding gains are achieved when the bit error rate of a data transmission is improved for a given signal-to-noise ratio. Lower bit error rates are generally better because this means that fewer errors are received for a certain number of bits transmitted. Various digital communication systems, including, for example, MoCA systems, generally experience both additive white Gaussian noise and interference. The interference can be, for example, from the transmissions of other electronic devices. Accordingly, in some circumstances, digital communication systems that improve coding gain in the presence of both additive white Gaussian noise and interference can provide an improved overall system performance. Therefore, there is a need for method and apparatus that provide coding gains in the presence of both additive white Gaussian noise and interference.

BRIEF SUMMARY OF EMBODIMENTS OF THE INVENTION

Embodiments of systems and methods for probing a wired communication channel are presented. Some embodiments of the disclosed method and apparatus are directed toward systems and methods that estimate noise variance. These method and apparatus estimate a true noise variance using a combination of long-term data aided and non-data aided algorithms and an interference variance using a short-term data aided algorithm. Using these noise and interference variance estimates, an interference hypothesis may be determined. In some embodiments, the non-data aided algorithm computes the variance for a decision directed noise sample and the variance for the decision directed noise is converted to a true noise variance per packet. The variance for the decision directed noise is converted to a true noise variance per symbol. An interference hypothesis is determined based on the true noise variance estimation per symbol and the true noise variance estimation per packet. The presence of noise is determined based on a comparison of the true noise variance per packet, the true noise variance per symbol, and each hypothesis. The long-term noise variance may also be computed using the long-term noise variance in place of a variance for a decision directed variance estimation for a subsequent determination of the presence of interference.

Some embodiments set an initial indicator to indicate that interference is not present when at least one interference hypothesis indicates that interference is not present. When two symbols each contain one or more hypotheses indicating that interference is present, an interference indicator may be set to indicate this. The indicator from an interference state to a noninterference state can be changed based on a predetermined number of noninterference hypotheses or a predetermined number of interference hypotheses.

Some embodiments are implemented in an OFDM device. OFDM is sometimes used in wired communication networks, such as coaxial digital data network, including MoCA networks. Embodiments can be implemented for use in conjunction with such networks.

Some embodiments generate an interference hypothesis indicating the presence of a predetermined level of interference in a communication signal. This can be done by estimating a true noise variance using a long-term data aided algorithm, estimating an interference variance using a short-term data aided algorithm, and determining an interference hypothesis based on comparing the noise and interference variance estimations. The interference variance can be determined by computing the received signal power for each channel estimation symbol (for example, transmitted as a part of preamble, before data payload). The system verifies that a received signal power measurement for a channel estimation symbol is within a predetermined threshold of another received signal power measurement for another channel symbol. The true noise variance is compared to the interference estimate and an interference hypothesis can be set to indicate that interference is present if the received signal power and the true noise variance are within predetermined thresholds.

In some embodiments, an interference hypothesis indicating the presence of a predetermined level of interference in a communication signal is determined. Various intermediate steps may be performed, including: (1) computing the variance for a decision directed noise sample, (2) converting the variance for the decision directed noise to a true noise variance per packet, and (3) converting the variance for the decision directed noise to a true noise variance per symbol. The interference hypothesis is determined based on the true noise variance estimations per symbol and the true noise variance per packet.

In some embodiments, an interference hypothesis indicating the presence of a predetermined level of interference in a communication signal is determined. This can be done by estimating a true noise variance using a long-term data aided algorithm and estimating an interference variance using a short-term data aided algorithm. In some embodiments, the interference hypothesis is determined based on comparing the noise and interference variance estimations and setting an interference hypothesis to indicate that interference is present if the estimate of interference variance using the short-term data aided algorithm is above a predetermined threshold. In some embodiments the threshold is a predetermined amount above the estimate of true noise that is determined using the long-term data aided algorithm.

In some embodiments, interference detection may be determined by estimating a true noise variance using a long-term data aided algorithm, estimating an interference variance using a short-term data aided algorithm, and determining an interference hypothesis based on comparing the noise and interference variance estimations. The interference hypothesis is calculated in, some embodiments, by computing the received signal power for each channel estimation symbol. The received signal power measurement for a channel estimation symbol is verified to determine that it is within a predetermined threshold of another received signal power measurement for another channel symbol. The true noise variance is compared to the interference estimate and an interference hypothesis can be set to indicate that interference is present if the received signal power and the true noise variance are within predetermined thresholds.

Some embodiments may also determine a second interference hypothesis. This determination can be based on comparing the noise variance estimations and setting an interference hypothesis. The interference hypothesis indicates that interference is present if the estimate of true noise, using the short-term data aided algorithm, is a predetermined threshold above the estimate of true noise using the long-term data aided algorithm. An initial decision may be set to indicate that interference is present if both of the interference hypotheses indicate this.

Other features and aspects of the disclosed method and apparatus will become apparent from the following detailed description, taken in conjunction with the accompanying drawings, which illustrate, by way of example, the features in accordance with embodiments. The summary is not intended to limit the scope of the method and apparatus, which is defined solely by the claims attached hereto.

BRIEF DESCRIPTION OF THE DRAWINGS

The disclosed method and apparatus, in accordance with one or more various embodiments, is described in detail with reference to the following figures. The drawings are provided for purposes of illustration only and merely depict typical or example embodiments of the claimed invention. These drawings are provided to facilitate the reader's understanding of the disclosed method and apparatus and should not be considered limiting of the breadth, scope of the claimed invention. It should be noted that for clarity and ease of illustration these drawings are not necessarily made to scale.

Figure 1:
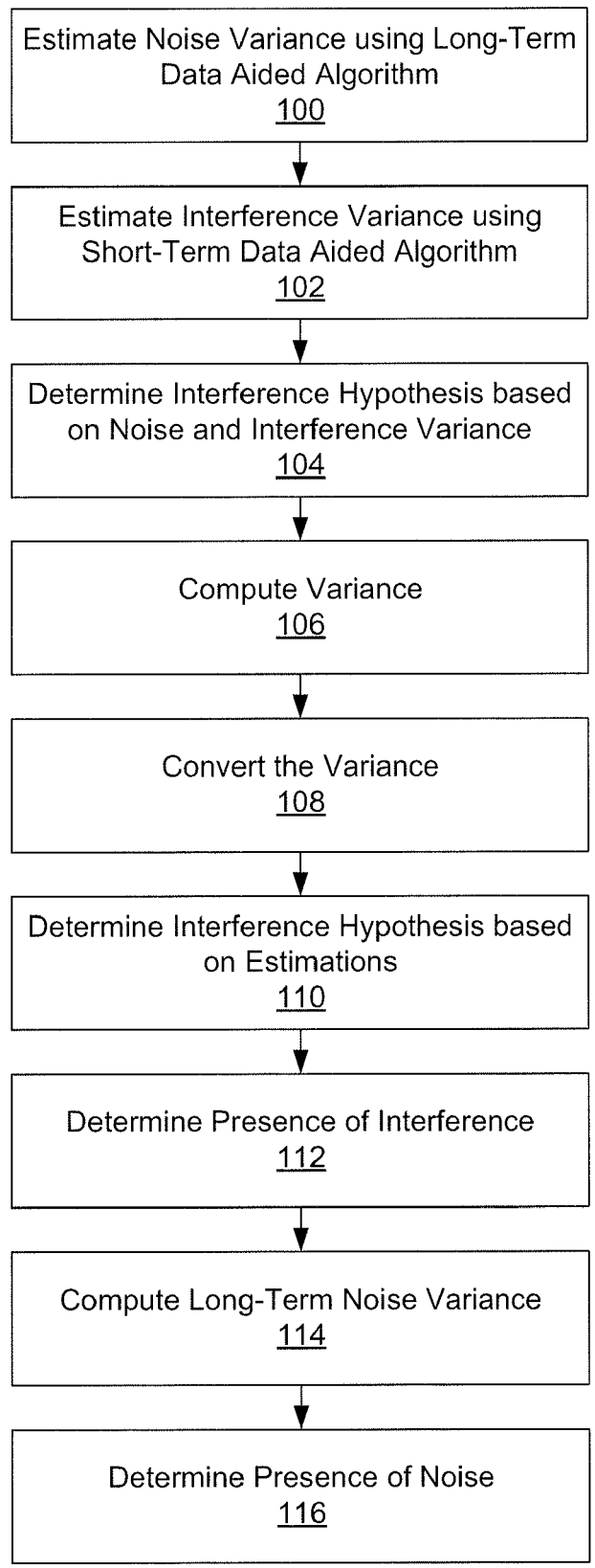
FIG. 1 is a flowchart illustrating an example method in accordance with systems and methods described herein.

The figures are not intended to be exhaustive or to limit the disclosed method and apparatus to the precise form disclosed. It should be understood that the disclosed method and apparatus could be practiced with modification and alteration. The claimed invention should be defined only by the claims and the equivalents thereof.

DETAILED DESCRIPTION OF THE EMBODIMENTS OF THE INVENTION

The disclosed method and apparatus relates to communication systems, and more particularly, some embodiments relate to systems and methods for estimating noise variance. In some embodiments, the method and apparatus addresses the problem of accurate noise variance estimation used in computation of a log-likelihood ratio function that are used by concatenated (recursive) decoders. Examples include, but are not limited to low-density parity check, turbo product code and turbo codes, etc. In addition in order to address the problem of log-likelihood ratio computation in presence of co-channel narrow-band interference (e.g., GSM or other cellular interference on Coax networks) a coarse estimation of interference powers may be performed. The method and apparatus may enable sophisticated channel coding algorithms to be used for obtaining maximum coding gain, thereby improving the bit error rate for the same level of signal-to-noise ratio in additive white Gaussian noise channels. Additionally, the method and apparatus may also provide better coding gain in presence of interference.

Generally, noise variance estimation can be categorized as data aided and non-data aided. Data aided estimators assume knowledge of transmitted symbols, e.g., in form of a training sequence, while non-data aided schemes do not assume any prior knowledge of the data. In some embodiments, usage of both data aided and a variant of non-data aided algorithms may provide accurate estimation of noise when there is no interference. Additionally, when the system experiences interference, it detects the interference level and computes its instantaneous variance to update the log-likelihood ratios. The data aided algorithm operates on training symbols (e.g., EVM probes in MoCA) to provide an estimation of the signal-to-noise ratio, using a least square-based approach. The non-data aided approach may follow the data aided estimation.

In some embodiments, the combination of the data aided and non-data aided approaches improve the accuracy of signal-to-noise ratio or noise variance estimation by processing the data symbols using a decision-directed algorithm. This may be important because in some scenarios the training sequence length may be limited to avoid considerable throughput overhead. This limited length limits the averaging accuracy. Additionally, if the noise or interference condition changes between training sessions the non-data aided approach the system may be able to determine the reception of the interference and update the log-likelihood ratios accordingly. Interference may be caused by, for example, cellular interference on a coax cable. An example of a change in noise level is a temperature change in an outdoor unit, which could change the thermal noise variance, etc.

The non-data aided approach comprises computation of noise variance (or signal-to-noise ratio) by computing the power of an error signal. This error signal may include the difference between the received signal and its detected version. The detection may be performed using a simple nearest neighbor slicer. Power of the error signal is also computed. The error signal power can be considered as the decision directed noise. This decision-directed noise is different from additive white Gaussian noise. It is not the variance of the decision directed noise, but that of the original noise $N(k,l)$ (where k refers to the subcarrier index and l refers to the symbol index in an OFDM system) that is desired for the log-likelihood ratio computation. It can be shown that, even though the original noise has a Gaussian distribution, the decision-directed noise ceases to be Gaussian.

The probability density function of decision-directed noise for square Quadrature Amplitude Modulation (QAM) constellations, using an extension of the approach introduced for Pulse Amplitude Modulation (PAM) signals may be determined. Based on this probability density function, a closed form expression for the decision-directed noise variance, in terms of the original noise variance can be computed. Simulations indicate that this closed form can also be applied to the cross constellations, with minimal error. The signal-to-noise ratio and noise variances may be computed using decision-directed to additive white Gaussian noise conversion tables over a wide range of signal-to-noise ratios and for a wide range of QAM constellations.

In some embodiments, a hybrid algorithm based of hypothesis definition during the preamble (data aided part) and data (decision-directed part) portion of received packets may be used. The hypotheses can be defined by comparing the received signal power with a threshold as well as observing its variation.

These method and apparatus may provide a balance between accuracy of the noise/interference variance estimation for the log-likelihood ratio computations (long term averaging) and reaction time to a hit by random interference. This is accomplished by using short-term averaging in conjunction with hypothesis testing, which protects the bit-error-rate performance against the degradation due to log-likelihood ratio inaccuracy as well as interference hit.

FIG. 1 is a flowchart illustrating an example method in accordance with systems and methods described herein. In step 100, noise variance is estimated using a long-term data aided algorithm. In some embodiments, the long-term data aided algorithm computes the noise variance by comparing the data received for the error vector magnitude (EVM) probe to provide an estimate of signal-to-noise ratio. This estimate is determined after receiving EVM probe data over a relatively long period. For example, some embodiments may use approximately 1000 symbols. The EVM probe data received is compared to the known EVM data to estimate the signal-to-noise ratio. This may be done using a least squares based approach. A least squares approach is a method of fitting data. The best fit in the least-squares sense is that instance for which the sum of squared residuals has its least value. Least squares corresponds to the maximum likelihood criterion if the experimental errors have a normal distribution.

In step 102, the interference variance is estimated using a short-term data aided algorithm. In some embodiments, the short-term data aided algorithm computes the noise variance by comparing the data received for channel estimation (CE) symbols to provide an estimate of signal-to-noise ratio. This estimate is determined after receiving the CE portion of the preamble over a relatively short period. For example, some embodiments may use one or two CE symbols. The CE symbol data received is compared to the known CE data to estimate the signal-to-noise ratio. This may also be done using a least squares based approach.

In step 104, a per subcarrier interference hypothesis is determined based on a comparison of the noise and interference variance estimates. Some embodiments determine the interference hypothesis by comparing the short-term interference variance to the long-term noise variance. If the variance of the short-term interference is some predetermined level above the long-term noise variance and the magnitude of the received signal strengths during the CE symbols (per subcarrier) are within a predetermined percentage of each other then the hypothesis is set to "1"; otherwise set it to zero.

In a step 106, a variance for a decision directed noise sample is computed. The decision direct noise is the difference between the received signal and the hard-decision" data symbols. In other words, the difference between the received signal and the data symbol that was most likely transmitted. The decision directed noise for a number of samples is used to determine a variance for the decision directed noise of these samples.

In a step 108 the variance is converted. In some embodiments, the variance for the decision directed noise is converted to a true noise variance per packet. The variance for the decision directed noise is converted to a true noise variance per symbol. These conversions may be made using a lookup table and interpolation. For example, a conversion table may be stored in a memory of a device implementing the systems and methods described herein. The variance of the decision directed noise is mapped to a true noise variance per packet, a true noise variance per symbol, or both, based on values stored in the memory. When the variance of the decision directed noise is between values stored in the memory, the mapped value can be an interpolated.

In a step 110, a hypothesis is determined based on the true noise variance estimation per symbol and the true noise variation per packet. Some embodiments determine the interference hypothesis by comparing the true noise variance estimation per symbol and the long-term true noise variance computed at the end of each data packet. If the true noise variance estimation per symbol is greater than the true noise variation per packet then interference may be present.

In a step 112, the presence of interference for the data portion of a packet is determined based on a comparison of the true noise variance updated per packet, the true noise variance per symbol, and each hypothesis. In some embodiments, the determination may be based on the number of successive interference states determined. For example, in some embodiments, it takes three successive "interference" symbols to change a "no interference" state to an interference state. Conversely, it takes three successive no interference symbols to change from an interference state to a no interference state.

In step 114, a long-term noise variance is computed. The long-term noise variance estimation can be initially computed using a data aided approach and then can be further updated during the data portion of each packet using a decision-directed approach.

Figure 2:
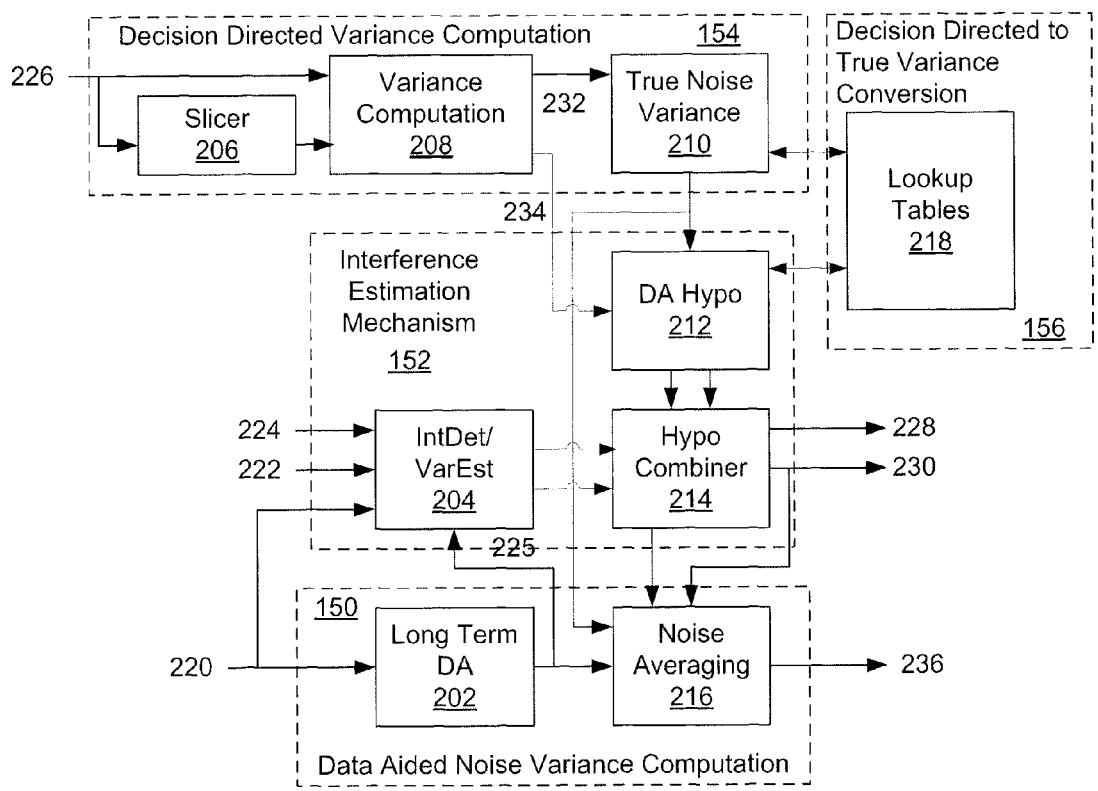
FIG. 2 is a block diagram illustrating an example apparatus in accordance with the systems and methods described herein.

In a step 116, the long-term noise variance and the decision directed variance estimation can be combined to determine the presence of interference, as is discussed with respect to FIG. 2. The long-term noise variance can provide a more accurate and stable noise variance calculation.

FIG. 2 is a block diagram illustrating an example system in accordance with the methods and apparatus described herein. The diagram includes a data assisted noise variance computation section block 150, an interference estimation mechanism section 152, a decision directed noise variance computation section 154, and a variance conversion section 156.

The data aided noise variance computation block includes block 202. This block 202 computes the variance for true noise based on the EVM using a long-term data algorithm and a block 216 that processes the noise averaging and switching algorithm. EVM Probe data 220 is input into the block 200 for this calculation. The results of the calculation are used by block 216 for the noise averaging and switching algorithm and by the interference estimation block 152.

The interference estimation block includes block 204, which computes the variance for interference using a short-term data aided algorithm; block 212, which converts decision directed noise to true noise variance using a short-term conversion; and block 214, which performs interference detection averaging and packet noise variance calculations. Block 204 receives as inputs the training probe symbols 220, the interference history 222, the channel estimation (CE) symbols 224, and the data aided long-term noise variance estimation 225 (the output of block 202). The block 204 calculates the values for $C_{hypo}(k,p)$ which represents the hypothesis signal based on processing the CE symbols and is a function of the subcarrier index (k) and the packet index (p). The interference history 222 may be used, for example, in systems that only have one channel estimation symbol. In such a system, the interference history 222 indicates if interference existed in a previous packet. It may be based on the immediately previous packet, some average of multiple previous packets, a summation of multiple packets, or other combinations of interference information on previous packets. In some embodiments, the interference history signal might be active, indicating interference, if the last three packets included interference, for example. It might also be software controlled such that the calculation of history can be changed based on the environment.

Block 212 converts decision directed noise to true noise variance using a short-term conversion that will be used as the variance for interference. The conversion is performed using lookup tables 218 in block 156. The block 212 can also calculate $D_{hypo}(k,p)$ values which represent the hypothesis signal for the portion of the interference detection mechanism that is based on the data portion of the packet. Similar to $C_{hypo}$, this signal is a function of the subcarrier index (k) and the packet index (p). The short-term decision directed noise variance 234, $C_{hypo}(k,p)$, and $D_{hypo}(k,p)$ are used by block 214 to determine if interference detection and output interference signals 228 and 230 are present or predicted to be present. The output interference signals 228 and 230 can include average interference per packet 228 and noise/interference signal 230.

The decision directed noise variance computation block 154 receives data symbols 226, which are input into the nearest neighbor slicer 206. The slicer 206 decodes, e.g., the QAM constellation for computation of decision directed noise. The data symbols and the decision directed noise are used to compute the variance for noise or interference in block 208 using both the short-term and long-term decision directed algorithm. The variance for interference can be short term, per symbol 234; or long term, per packet 232. The variance for interference per packet is converted into true noise variance in block 210 using a long-term conversion. The block 210 performs the conversion using lookup table 218.

Some embodiments use both data aided and a variant of non-data aided noise variance (or signal-to-noise ratio) estimation for interference detection. The data aided algorithm, block 150, operates on EVM data to provide an estimate of the signal-to-noise ratio. Some embodiments use a least squares based approach for this calculation. A non-data aided approach, block 154, is used following the data aided estimation. In some embodiments, these calculations are performed in parallel. Using non-data aided methods may lead to more reliable noise variance estimation in long packets where the initial signal-to-noise ratio estimation may not be valid anymore due to temperature changes or other factors in the system that may change over time. Additionally, due to its direct impact on network throughput, the length of training sequence may be limited. Accordingly, the accuracy of signal-to-noise ratio estimate is generally limited. In some embodiments, extra averaging can improve the noise variance accuracy.

In some embodiments, in order to achieve a good signal-to-noise ratio estimation accuracy long training symbols are used, e.g., approximately 1000 symbol. Using such a large number of symbols can introduce a significant overhead on the system causing throughput reduction. Usage of non-data aided estimations can help reducing or eliminating the need for the training sequence. Reducing or eliminating the training sequence increases the throughput.

Additionally, by using a none-data aided estimation, a per symbol noise variance update can be achieved which is useful in updating the log-likelihood ratios. This may be used to adjust the noise variance estimation when, due to narrow-band interference, significant change in signal-to-noise ratio occur across a few successive symbols. The significant change in signal-to-noise ratio indicates an "interference-hit" scenario. In other words, the device is receiving interference, such as cellular interference. By being able to determine when an interference-hit scenario occurs, a system may help protection against cellular interference when it is initiated during the data payload.

In some embodiments, the non-data aided approach used is not a blind algorithm, but rather a decision directed method that employs hard-decision of received symbols to be used in noise measurement process. In computing the signal-to-noise ratio, the parameter of interest in both data aided and non-data aided estimations is $\lambda = E_S/\sigma_n^2 = E_S/(N_0/2)$ or $\lambda = 2E_S/N_0$ for real constellations (binary PSK) and $\lambda = E_S/2\sigma_n^2 = E_S/N_0$, for complex constellations, where $E_S$ is the average energy per coded symbol and $N_0$ is the noise power spectral density. In some embodiments, the signal model used in both data aided and non-data aided computations is a representation of per sub-carrier received signal in digital domain after sampling and decimation (to the data rate) and at the output of the fast Fourier transform which can be represented by:

$Y(k,l) = H(k)X(k,l) + n(k,l)$ where $k$ represents the subcarrier index and $l$ represents the OFDM symbol index (eq. 1)

Y is the received signal,

H is the channel affecting sub-carrier k,

X is the transmitted signal, and, n is the additive white Guassian noise component In some embodiments, these computations are used in both data aided and non-data aided Noise Variance estimations.

In some embodiments, for the data aided algorithm, it can be shown that, assuming binary PSK modulation on each sub-carrier, when the transmitted symbols X(k,l) are known at the receiver, an estimate of the noise variance at each sub-carrier can be achieved in a least squared sense. For quadrature PSK modulation the above computational method is still valid and the only difference with quadrature PSK is that both the signal and the noise variance levels would be doubled and we have:

$$\hat{\sigma}_n^2(k) = \frac{1}{L_T}\sum_{l=0}^{L_T-1}|Y(k,l)|^2 - |\hat{H}(k)|^2 = \quad \text{(eq. 2)}$$

$$\frac{1}{L_T}\sum_{l=0}^{L_T-1}|Y(k,l)|^2 - \frac{1}{L_T^2}\left[\sum_{l=0}^{L_T-1}\frac{Y(k,l)}{X(k,l)}\right]^2$$

where $$\hat{H}(k) = \frac{1}{L_T}\sum_{l=0}^{L_T-1}H(k)$$

is the estimate of channel impulse response in least squares sense, and $L_T$ is the Training sequence length.

and the signal to noise ratio can be computed from:

$$(\hat{\lambda}_k) = \quad \text{(eq. 3)}$$

$$\left(\frac{\hat{E_S}(k)}{\sigma_n^2(k)}\right) = \left(\frac{2\hat{E_S}(k)}{N_0(k)}\right) = \frac{\frac{1}{L_T^2}\left[\sum_{l=0}^{L_T-1}\frac{Y(k,l)}{X(k,l)}\right]^2}{\frac{1}{L_T}\sum_{l=0}^{L_T-1}|Y(k,l)|^2 - \frac{1}{L_T^2}\left[\sum_{l=0}^{L_T-1}\frac{Y(k,l)}{X(k,l)}\right]^2}$$

For quadrature PSK modulation the above computational method is still valid and the only difference with quadrature PSK is that both the signal and the noise variance levels would be doubled and we have:

$$\hat{\sigma}_{n_C}^2(k) = \frac{1}{L_T}\left[\sum_{l=0}^{L_T-1}|Y(k,l)|^2\right] - |\hat{H}(k)|^2 = \quad \text{(eq. 4)}$$

$$\frac{1}{L_T}\left[\sum_{l=0}^{L_T-1}|Y(k,l)|^2\right] - \frac{1}{L_T^2}\left[\sum_{l=0}^{L_T-1}\frac{Y(k,l)}{X(k,l)}\right]^2$$

$$\hat{H}(k) = \frac{1}{L_T}\sum_{l=0}^{L_T-1}H(k) \quad \text{(eq. 5)}$$

$$(\hat{\lambda}_k) = \quad \text{(eq. 6)}$$

$$\left(\frac{\hat{E_S}(k)}{\sigma_{n_C}^2(k)}\right) = \left(\frac{\hat{E_S}(k)}{N_0(k)}\right) = \frac{\frac{1}{L_T^2}\left[\sum_{l=0}^{L_T-1}\frac{Y(k,l)}{X(k,l)}\right]^2}{\frac{1}{L_T}\sum_{l=0}^{L_T-1}|Y(k,l)|^2 - \frac{1}{L_T^2}\left[\sum_{l=0}^{L_T-1}\frac{Y(k,l)}{X(k,l)}\right]^2}$$

The energy per symbol $E_S$ for quadrature PSK is twice of binary PSK in the above equations.

Another data aided approach is a standard EVM computation method. In this method, the noise estimate is first computed by subtracting the post channel equalization training data and then computing its average power. If we define the post channel equalization received symbols as $Y_C(k)$ the noise power can be computed from the following average:

$$\hat{\sigma}_n^2(k)|_{EVM} = \frac{1}{L_T}\sum_{l=0}^{L_T-1}|Y_C(k,l) - X(k,l)|^2 \quad \text{where:} \quad \text{(eq. 7)}$$

$$Y_C(k,l) = \frac{Y(k,l)}{\hat{H}(k,l)} = \frac{H(k)X(k,l) + N(k,l)}{\hat{H}(k)}$$

is the channel equalized received signal.

Y(k,l) is the received signal, X(k,l) is the transmitted signal, n is the additive white Gaussian noise component, k is the subcarrier index and l is the OFDM symbol index
H(k) is the channel $\hat{H}(k)$ and is its estimate In some embodiments, the decision-directed algorithm is based on measurement of "decision directed noise variance" and converting this measurement to the actual noise variance estimation, using look-up tables, and linear interpolation. The decision-directed noise is defined as the error difference between the received signal and the "hard-decisioned" data symbols. More specifically the decision-directed noise and its variance can be computed by:

$$\hat{N}(k,l) = Y(k,l) - H(k)\hat{X}(k,l) \quad \text{(eq. 8)}$$

where k represents the estimation of $\hat{X}(k,l)$ obtained by Hard Decision
and $\hat{N}(k,l)$ is the DD noise $$\sigma_{\hat{n}}^2(k) = \frac{1}{L_D} \sum_{l=1}^{L_D} |\hat{N}(k,l)|^2 \quad \text{(eq. 9)}$$

Note that the decision-directed noise is different from the original additive white Gaussian noise added to the signal. Unfortunately, it is not the variance of the decision directed noise, but that of the original noise N(k,l) that is desired for log-likelihood ratio computation. It can be shown that, even though the original noise has Gaussian distribution, the decision-directed noise ceases to be Gaussian. We drove, the exact probability density function of decision-directed noise for QAM constellations, using an extension of the approach introduced for PAM signals in the literature. Based on this probability density function, a closed form expression for the decision-directed noise variance, in terms of the original noise variance is computed. More specifically it can be shown that the decision-directed noise variance is:

$$\sigma_{\hat{n}(I/Q)}^2 = \sigma_{\hat{n}}^2 = C(-1, 0, \sigma_n) - \frac{(M-2)}{M}C(1, 0, \sigma_n) + \quad \text{(eq. 10)}$$
$$\frac{2}{M}\left(\sum_{k=1}^{M-1}(M-k)C(-1,k,\sigma_n) - (M-k-1)C(1,k,\sigma_n)\right)$$

where $C(x,k,\sigma_n) = \int_x^\infty u^2 f_N(u+2kH,\sigma_n)du$, and:

M: is the alphabet size on each axis, i.e. Re/Im[X(k,l)]=±1, ±3, ±5, . . . , ±(M−1)
$\sigma_{\hat{n}(I/Q)}^2 = \sigma_{\hat{n}}^2$: is the variance estimation of the I or Q component of the DD noise
$\sigma_n^2$: is the variance estimation of the I or Q component of the true additive white Gaussian noise Because post channel equalization processing is assumed, the channel, H, may be dropped in the equations. Generally, the channel, H, should be a number close to one. Once the relation between decision-directed noise and additive white Gaussian noise or true noise is established, the decision-directed noise can be determined by statistical collection. In some embodiments, the received signal and hard decisions are used. These are converted to the true noise variance using the inverse function of the above relation. Pre-computed values at certain signal-to-noise ratio levels (say 1 dB steps) may be used to avoid computing the inverse of the above complex function per sub-carrier. The signal-to-noise ratio range of interest may be determined by interpolating between the points to obtain the true noise variance.

FIG. 2 illustrates that a combination of short-term and long-term estimations in conjunction with a lookup table can be used for interference detection. As illustrated in FIG. 2, a combination of data aided and decision-directed approaches are used for both noise and interference processing. For noise variance estimation, block 202 computes the long-term average using a training sequence 220. After the training ended, this value is updated though a decision-directed scheme supported by blocks 206, 208, and 212. In particular, blocks 206 and 208 compute "instantaneous" (per symbol) and long term (across multiple packets) noise variances 230 and 232. It will be understood that "instantaneous" noise variance 230 is not truly instantaneous, but rather, the calculation simply occurs more quickly, e.g., one per symbol, then the long-term conversion. The decision-directed-based long-term noise variance is then added to the data aided long-term value computed at the output of block 202 in block 216. For interference detection/variance estimation block 204 performs a coarse estimate of interference variance and generates a hypothesis signal (by comparing per sub-carrier noise powers computed in blocks 202 and 204, as well as the level of variation in signal power from symbol to symbol). This initial average and hypothesis ($C_{hypo}$) are then applied to module 214, which by combining with the converted (from decision directed to true values) version of short-term measurements of block 208, can provide a per packet noise/interference variance estimation. More specifically, block 212 converts the decision-directed noise to additive white Gaussian noise and generates the data-based hypothesis signals. Some embodiments may include using two hypotheses generating blocks 204 and 212. These blocks may generate hypothesizes based on, for example, the first though third OFDM symbols of the received data. Finally, block 214 combines the hypothesis from blocks 204 and 212 to make a final decision on the noise vs. variance and compute the corresponding variance.

The hypothesis from block 204 can be based on a threshold and changes in the signal that are indicative of noise. If a signal is above a certain threshold it is likely that it is interference. Interference generally has more power than random noise. Additionally, random noise generally tends to vary significantly more frequent than an interference signal, accordingly, random changes in the signal from one packet to the next may indicate the presence of noise rather than an interference signal.

The hypothesis of block 212 can be based on changes in the signal that are indicative of noise. Generally, a threshold is not used to make this hypothesis because the signals used in the calculations of block 204 may be saturated before the threshold is exceeded in block 212, due to the decision directed approach.

Note that for sub-carriers hit by interference a quick interference detection and variance estimation is possible since the interferer is assume to be stationary relative to the received packet (hence it has a constant envelope with a power much larger than the noise floor). A switch in module 216 controls whether the noise or interference variance is being produced at output 236. The noise variance can be a combination of both the decision directed noise and data aided noise calculations. Noise variance is typically used when an interference signal is not present. When an interference signal is present, it will generally overpower the noise signal. Accordingly, when interference is present an interference variance signal may be directed through block 214 to block 216 and output from block 216.

Figure 3:
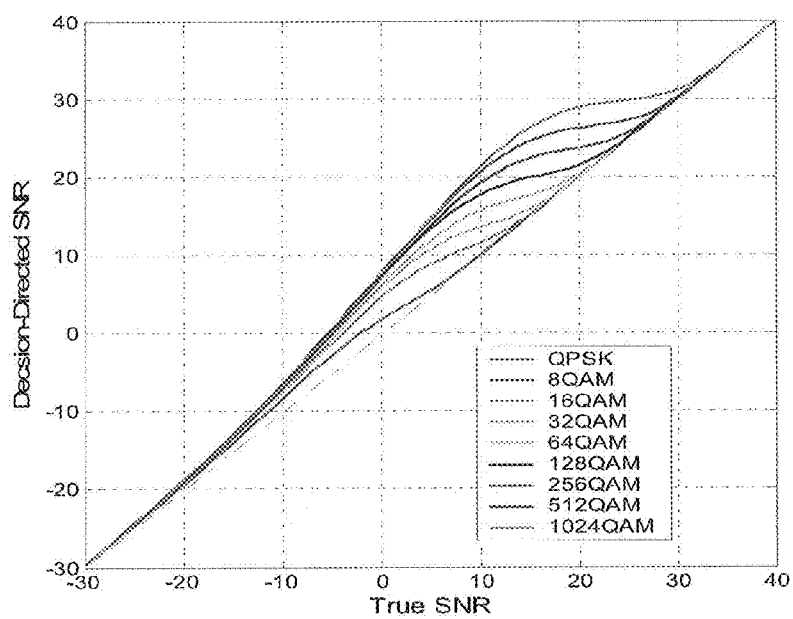
FIG. 3 is a diagram that illustrates a simulation comparing the accuracy of signal-to-noise ratio estimation for different training lengths in accordance with the systems and methods described herein.

FIG. 3 is a diagram that illustrates a simulation comparing the accuracy of signal-to-noise ratio estimation for different training lengths in accordance with the systems and methods described herein. The relation between computed signal-to-noise ratios based on decision-directed noise and the true noise variance measurements (or decision-directed signal-to-noise ratio vs. true signal-to-noise ratio) over a wide range of signal-to-noise ratios for a number of QAM modulations are illustrated. Over a long range of values, the signal-to-noise ratio estimate based on decision-directed measurement is optimistic compared to the actual signal-to-noise ratio, for most of the signal-to-noise ratio/variance range. In addition, the curves become more non-linear for higher constellations. Nonetheless, at 1 dB steps, they can be approximated by a piecewise linear model. Accordingly, lookup tables on 1 dB scale may be used with linear interpolation. This should provide sufficient accuracy when estimating the relation between the measured decision-directed noise and the computed true noise variances. In some embodiments, if the accuracy of variance estimation required by coding is within 3 dB, interpolation may be avoided by rounding the decision-directed noise variance values to the nearest lookup table input level.

In some embodiments, the decision-directed algorithm first measures the decision-directed noise and then uses a lookup table to convert the values into true noise. In some cases, if required, linear interpolation is used to interpolate between two data points in the table.

Figure 4:
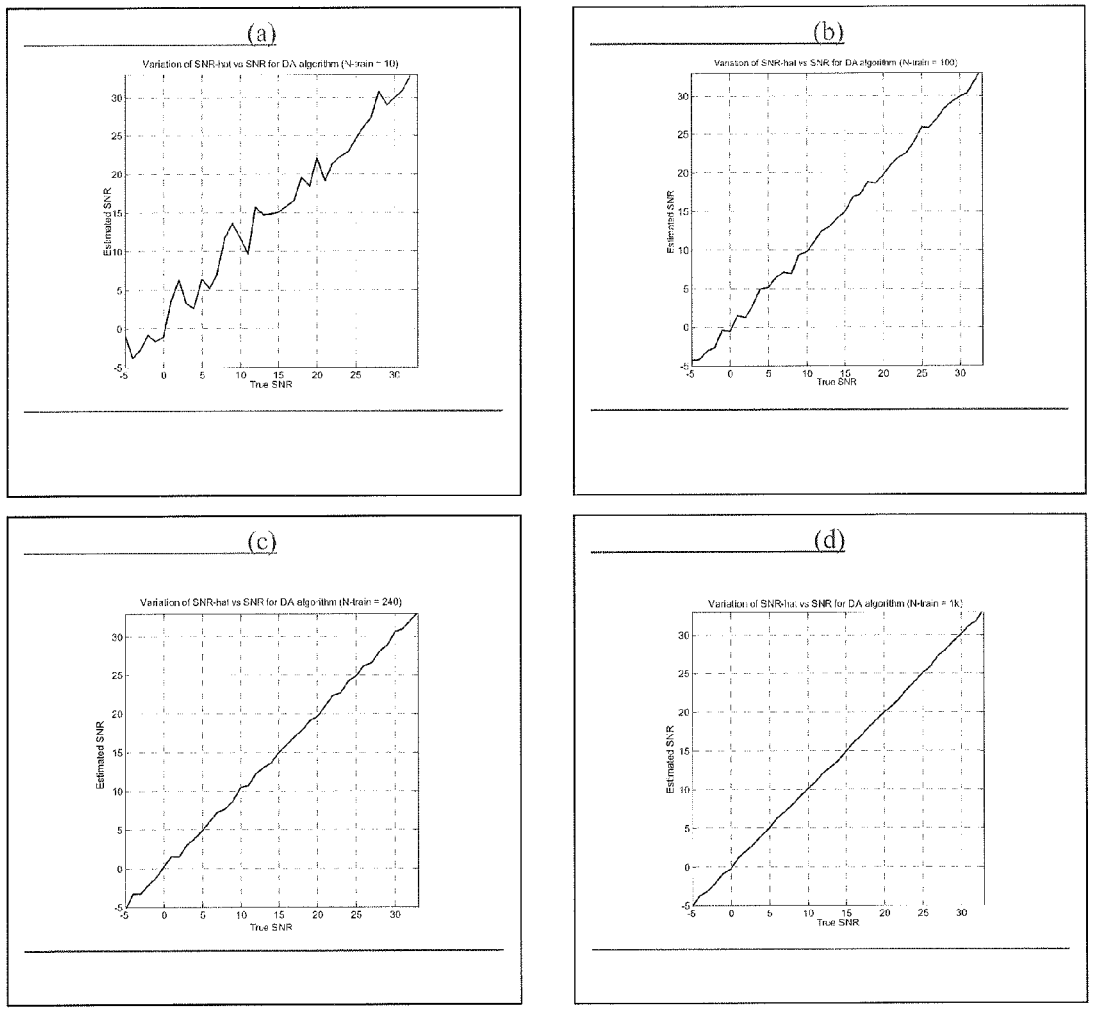
FIG. 4 is a graph illustrating estimated vs. true signal-to-noise ratio curves for different length training sequences.

FIG. 4 is a series of graphs illustrating estimated vs. true signal-to-noise ratio curves for different length training sequences. The graphs generally illustrate that as the number of training sequence symbols increase the estimation tends to improve. In FIG. 4a a training sequence of 10 is used. In FIG. 4b a training sequence of 100 is used. FIG. 4c uses a training sequence of 240 and FIG. 4d uses a training sequence of 1000.

Figure 5:
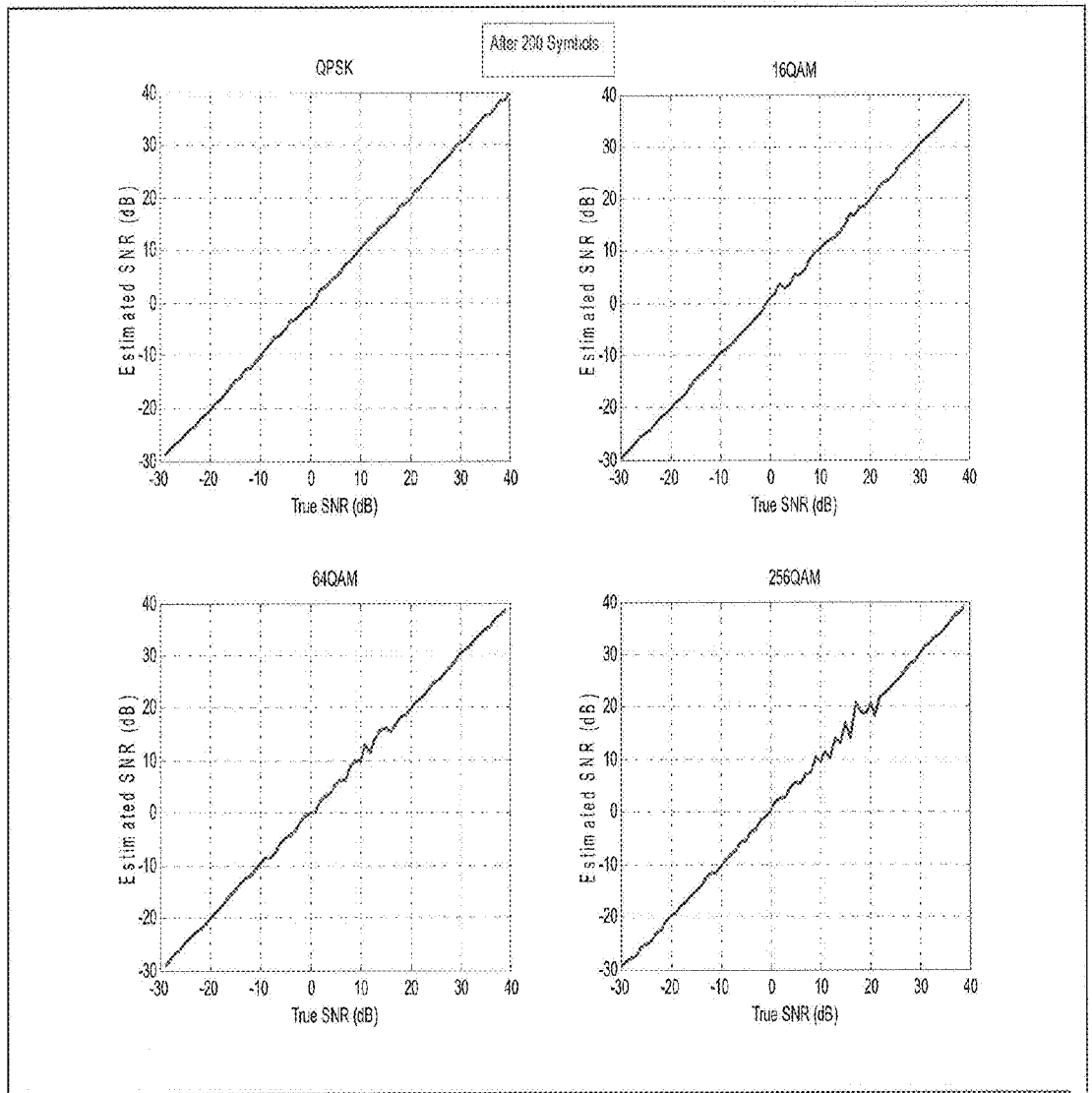
FIG. 5 is a diagram illustrating a comparison of a decision directed estimate vs. true signal-to-noise ration curves for different constellation sizes over 200 data symbols.
Figure 6:
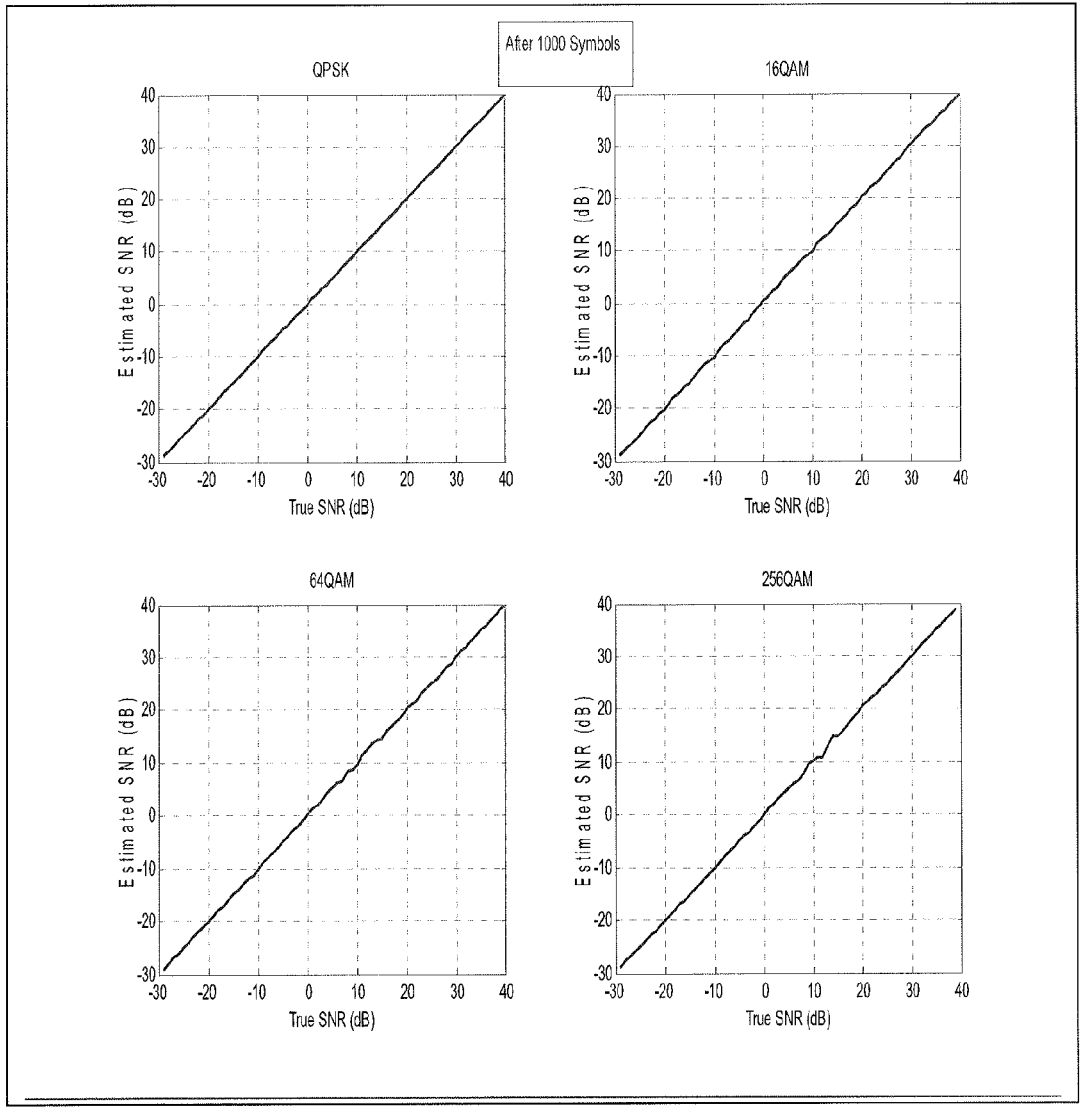
FIG. 6 is a diagram illustrating a comparison of a decision directed estimate vs. true signal-to-noise ration curves for different constellation sizes over 1000 data symbols.

FIG. 5 is a diagram illustrating a comparison of a decision directed estimate vs. true signal-to-noise ration curves for different constellation sizes over 200 data symbols. QPSK, 16 QAM, 64 QAM, and 256 QAM are all illustrated. Similarly, FIG. 6 is a diagram illustrating a comparison of a decision directed estimate vs. true signal-to-noise ration curves for different constellation sizes over 1000 data symbols. QPSK, 16 QAM, 64 QAM, and 256 QAM are again illustrated.

Figure 7:
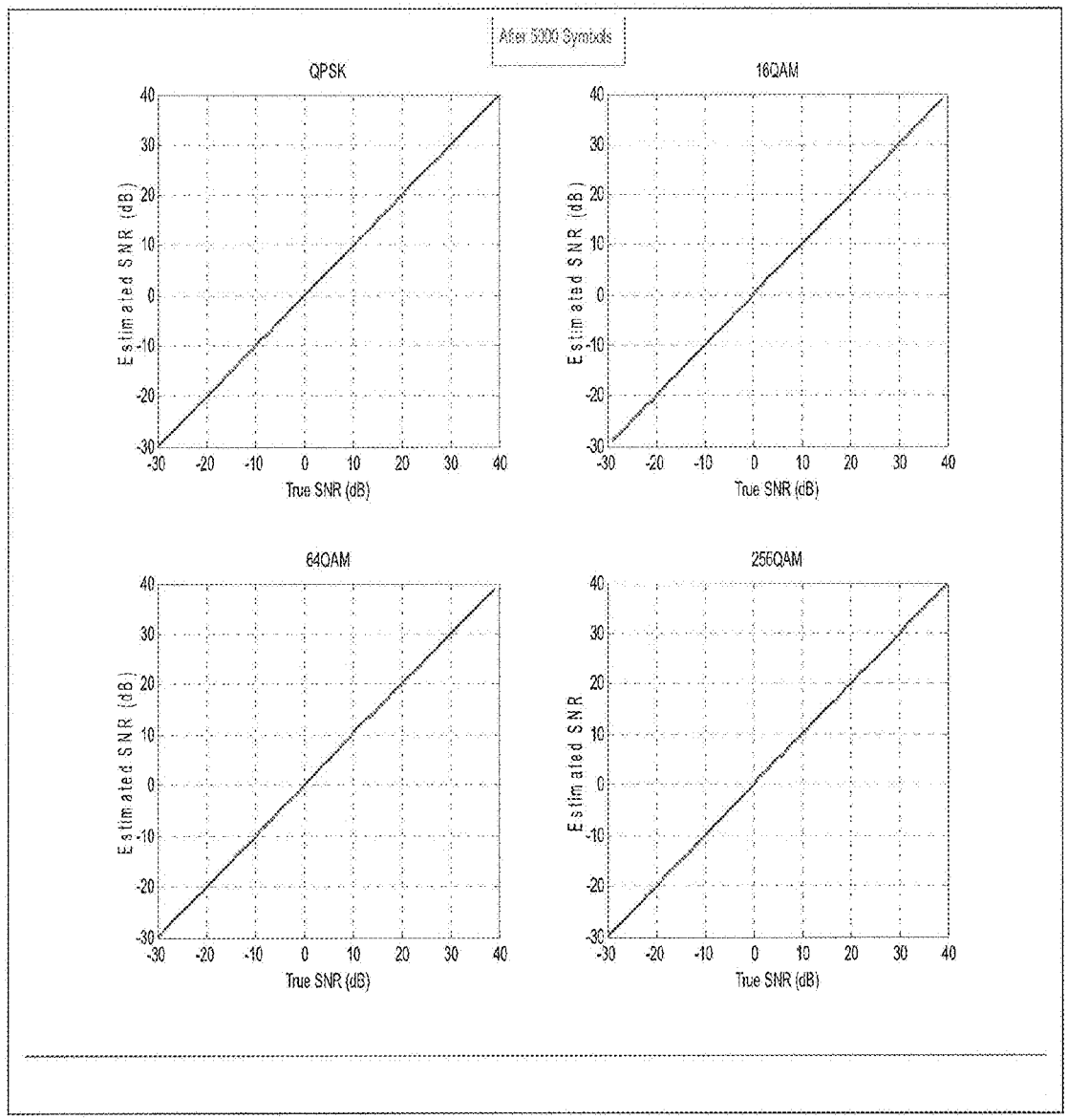
FIG. 7 is a diagram illustrating a comparison of a decision directed estimate vs. true signal-to-noise ration curves for different constellation sizes over 5000 data symbols.

FIG. 7 is a diagram illustrating a comparison of a decision directed estimate vs. true signal-to-noise ration curves for different constellation sizes over 5000 data symbols, similar to FIGS. 5 and 6, which illustrate the use of fewer symbols. FIG. 5, FIG. 6, and FIG. 7 illustrate the performance of decision-directed algorithm for different constellation sizes and for different averaging periods (data length of 200, 1000, and 5000 symbols respectively). As is illustrated in FIGS. 5, 6, and 7, an averaging over 1000 symbols could provide relatively accurate signal-to-noise ratio estimates even at large constellation sizes such as 256-QAM.

Based on the above the long term noise variance estimation can be initially computed using a data aided approach and then can be further updated during the data portion of each packet using a decision-directed approach, e.g., a long-term average of noise variance can be achieved in a form of:

$$\hat{\sigma}_n^2(k, l) = \frac{L_T \cdot \hat{\sigma}_n^2(k)|_{DA-Based} + l \cdot \hat{\sigma}_n^2(k, l)|_{DD-Based}}{(L_T + l)} \quad \text{(eq. 11)}$$

where l indicates the symbol index and $L_l$ is the length of training sequence.

On the other hand, estimation of the narrowband interference variance is based on the assumption that the interference that seriously affects sub-carriers has a significantly larger variance than the variance of their additive white Gaussian noise component. This is realistic assumption for the case of cellular interference on Coax, in particular, MoCA networks and makes detection, and estimation of interference variance much simpler (and faster) than noise since in this case the interference can be considered as a deterministic signal, which is much easier to measure. The detection of interference can be performed by computing and monitoring the instantaneous received signal power on the channel estimation symbols and the payload symbols such that when there is a significant change (say above 10-20 dB) in instantaneous variances (on certain set of sub-carriers) which is consistent across the channel estimation (CE) and data portion of MoCA packets, it can be concluded that an interferer has hit the sub-carriers.

More specifically, starting from the noise various computation expression introduced for the data aided algorithm above, if we calculate the signal power based on previous packet's channel estimate rather than current channel estimate we can write:

$$\hat{\sigma}_I^2(k)|_{CE-Based} = \frac{1}{L_{CE}} \sum_{l=0}^{L_{CE}-1} |Y(k, l)|^2 - |\hat{H}(k, p-1)|^2 = \quad \text{(eq. 12)}$$

$$\frac{1}{L_{CE}} \sum_{l=0}^{L_{CE}-1} |Y(k, l)|^2 - P_S(k, p-1)$$

Where p is the current packet #index, $\hat{H}(k, p-1)$ indicates the previous packet's channel estimate at sub-carrier index k.

Note that at high interference levels, the above computation over two CE symbols gives an estimate of the interference power, as the noise level is too low to affect computation (hence require large averaging). The previous packet channel estimate is considered as the last channel estimate before an interference hit occurs. Further accuracy of the estimation can be obtained by updating this estimate using data symbols based on the decision-directed algorithm. More specifically at symbol index 1, the decision-directed interference is computed from:

$$\hat{\sigma}_I^2(k, L) = \frac{1}{L} \sum_{l=1}^{L} |Y(k, l) - \hat{H}(k, l')\hat{X}(k, l)|^2 \quad \text{(eq. 13)}$$

which can be transformed to the true value using the lookup table but no interpolation is required. The value is references as $\hat{\sigma}_n^2(k,l)|_{DD-Based}$.

$$\frac{L_{CE} \cdot \hat{\sigma}_I^2(k)|_{CE-based} + l \cdot \hat{\sigma}_I^2(k, l)|_{DD-based}}{(L_{CE} + l)} \Rightarrow \quad \text{(eq. 14)}$$

When interference is detected $\sigma_I^2(k,l) = 0 \Rightarrow$ Otherwise where l indicates the symbol index and $L_{CE}$ is the number of channel estimation symbols (default of 2)

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the present invention. In addition, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Figure 8:
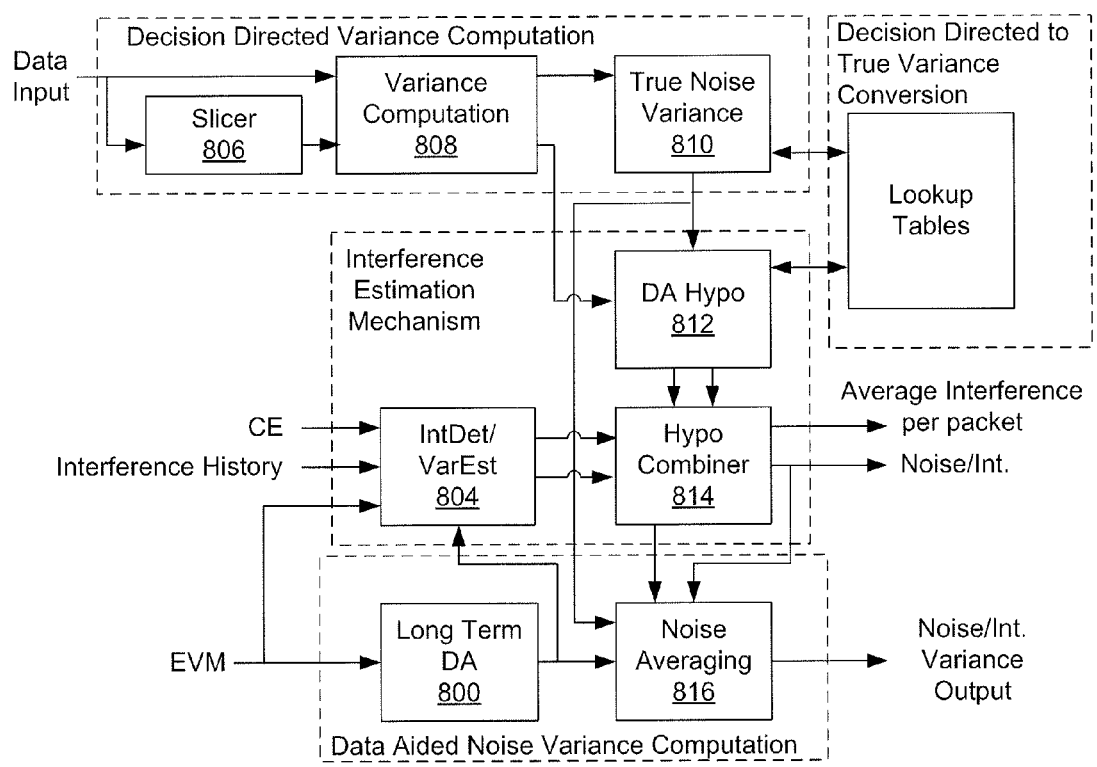
FIG. 8 is a block diagram illustrating an example apparatus in accordance with a MoCA implementation of the systems and methods described herein.

In some embodiments, the implementation of the noise/interference variance estimator for MoCA receivers are similar to the system discussed with respect to FIG. 2 and is discussed with respect to FIG. 8. The estimator constitutes a combination of data aided and decision-directed algorithm based blocks and a lookup table. The data aided algorithm is based on the EVM probes constituting, 8 probes of 30 symbols each or a total of 240 training OFDM symbols, or a smaller number. These systems and methods may be broken into various modules that perform certain tasks.

FIG. 8 is a block diagram illustrating an example apparatus in accordance with a MoCA implementation of the systems and methods described herein. Referring now to FIG. 8, a first module 800, includes an estimator that performs initial (data aided-based) variance estimation using the data aided algorithm (Eq. 2) discussed above. MoCA EVM probes (generated for bit loading every time a link requests a connection) are used and averaging is performed over the total number of symbols sent in EVM probes. This computation generates an estimate of the true noise variance and the channel or signal power $|H(k)|^2$. The latter is stored for usage during the channel estimation (CE) symbols in module 802.

Module 802 performs a computation, which is activated during the CE symbols in data packet preamble. The computation is according to Equation 12 using $L_{CE}$ of 2. The signal power computed during EVM probing in module 800 is used to measure a rough estimate of noise (or interference). More specifically, using a specific algorithm module 802 issues a hypothesis ($C_{hypo}$) on the existence of interference by comparing the computed (CE-based) noise variance computed in module 802 with EVM-based noise variances computed in module 800. This decision is communicated to module 814 though a binary signal. At the same time however, the computed (short-term) noise (or interference) power is also communicated to module 814. Module 814 will use the knowledge of decision-directed based and data aided based variances along with the associated hypothesis to decide on the interference. The algorithm for generation of the interference hypothesis is summarized as follows:

First, compute $|Y(k,l)|^2$ for each CE symbol and verify whether these values are within x % (e.g. 10%) of each other. If this is the case, condition 1 is satisfied. At the same time evaluate the summation of equation 12 and compare the estimated (short-term) noise variance to the long-term noise variance measured in module 800. If the variance of the short-term noise is xdB (e.g. 10 dB) above the long-term noise condition 2 is satisfied. If both conditions are satisfied, set the interference hypothesis (Chypo) to a "1." Otherwise, set it to zero. In addition, module 802 performs this measurement on each received preamble in order to establish an early indication of the interference.

The noise/interference variance estimation task also uses decision directed calculations that are activated during data payload. The decision directed calculations may be performed using, e.g., four modules, these modules are modules 806, 808, 810 and 812.

In some embodiments, module 806 can include a slicer that locally decodes the QAM constellations for computation of decision-directed noise. A nearest neighbor slicer may be used to perform this function. Module 808 implements equation 7 by providing an estimate on the per-sub-carrier decision-directed noise samples and their variance. Both short-term (per symbol) and long term (per packet), variances are computed. The task of provision of per packet estimation of long-term noise variance average is handled in module 810. This averaging is in addition to the long-term averaging performed in module 800.

Secondary averaging is used so that, in case a large number of packets are received by the receiving node between two EVM sessions, a better estimation of noise variance is performed through extra averaging. Additionally, if there is some change in thermal noise variance (due to temperature changes, etc.) the initial EVM-based noise variance can be updated. Once the decision-directed noise variance is known, it can be used to compute the true noise variance in modules 810, 812 and 818. The long-term average, updated on a per-packet basis, is computed at the end of each packet and is used by modules 810 and 816 to improve the accuracy of the original long-term (EVM-based) computation for upcoming data packet decoding. The maximum sequence length used in this averaging is considered as $N_{max}$, which is a function of the largest constellation supported (e.g., 1000 for 256 QAM). When this number is reached, the average value rests and the process starts over. The short term averaging on the other hand, is performed on a symbol-by-symbols basis, but it is not updated per packet. This estimate is used by module 812 to provide a short-term estimate of noise variance, which in turn is used, by module 814 for interference detection.

In some embodiments, module 810 translates the long-term (updated per packet) decision-directed noise variance to the true noise variance at the end of each packet (to be used for the next packet). The conversion is made though the lookup table of module 818 and using linear interpolation as mentioned.

In some embodiments, module 812 performs a computation similar to module 810 as it uses the decision-directed noise variance estimation and employs lookup table/interpolation to estimate the true noise variance. The main difference between modules 810 and 812 is that it unlike module 810, module 812 processes the short term-averaged decision-directed variance computed in module 808, on per symbol basis, to compute the true noise variance per symbol. Note that, as mentioned, unlike module 810, no interpolation is required. This module 812 also generates a hypothesis ($D_{hypo}$) to address interference presence. This second hypothesis has two purposes. First, it generates a secondary source to increase certainty of decision on $C_{hypo}$ generated in module 800. In addition, for longer packets (packets with a symbol length of 2 more) it can detect interference if it hits the packet during the data segment and after channel estimation symbols.

Some embodiments compare the estimated (short-term) noise variance to the long-term noise variance measured in module 800. If the variance of the short-term noise were xdB (e.g., 10 dB) above the long term noise the Interference hypothesis would be set to one. Otherwise, it will be set to zero. This process can be repeated for each upcoming symbol until the end of packet is reached.

In some embodiments, module 814 determines if interference is present and averages of the detected interference variance based on the measured long term and short-term noise variances and the two hypothesis signals ($C_{hypo}$ & $D_{hypo}$).

For example, using $C_{hypo}$ and the first value of $D_{hypo}$ ($D_{hypo}[1]$) make an initial decision on the interference. The packet has only one symbol and both values are "1," decide on "Interference" and set "niBit[k]" to one (niBit[k] is a binary signal at the output of module 814 indicating existence of interference on s per subcarrier basis.

If the packet has only one data symbol "and" either or both values of hypothesis signals is zero, decide on a "no Interference" set "niBit[k]" to zero and stop here. Otherwise, observe the $D_{hypo}$ value for the next symbol ($D_{hypo}[2]$).

If the packet has two or more symbols and $D_{hypo}[2]$ is a "1" decide on "Interference" and set "NiBit[k]" to one only if $D_{hypo}[1]$ was a "1." Otherwise, decide on a "No Interference" and reset "niBit[k]" to zero.

If the packet has three or more symbols keep the above decisions and switch the state only under either of the following scenarios: (a.) Change an "Interference" state into a "No interference" state only if three successive zeros are observed on Dhypo[n] (where n is the symbol index) or (b.) Change a "No interference" state into an "Interference" state only if three successive ones are observed on Dhypo[n] (where n is the symbol index).

In some embodiments, while making a decision, the instantaneous value of interference is computed by a weighted averaging performed on the two values of variance (decision-directed based and CE based). The signal inBit decides on whether this average value (as the interference variance) or the output of long-term noise averaging from module 816 (as the noise variance) is outputted by a noise/interference estimation system in accordance with the systems and methods described herein.

The averaging algorithm performs an instantaneous (per symbol) weighted averaging of the CE based and decision-directed based variance computation of the interference using equation 11. Note that as mentioned before, for MoCA application the training sequence length LT is considered as 240 (or 210, if the first EVM probe is discarded). In addition to short term averaging per sub-carrier, module 814 also generates average variance of the noise over the whole spectrum, on a per packet parameter.

In some embodiments, module 816 computes the long-term noise variance averaged over both EVM and Data payload. The averaging is performed according to equation 11. Note that the number data symbols in this equation are considered as the total number of data symbols that have been gathered so far. To maintain simplicity the maximum LD is considered to be around 1000 or larger. The length is defined by the largest constellation supported. After this number, the noise variance average obtained from decision-directed algorithm is reset and the process starts over. Note that the above long term averaging will reset itself on each new EVM session.

Figure 9:
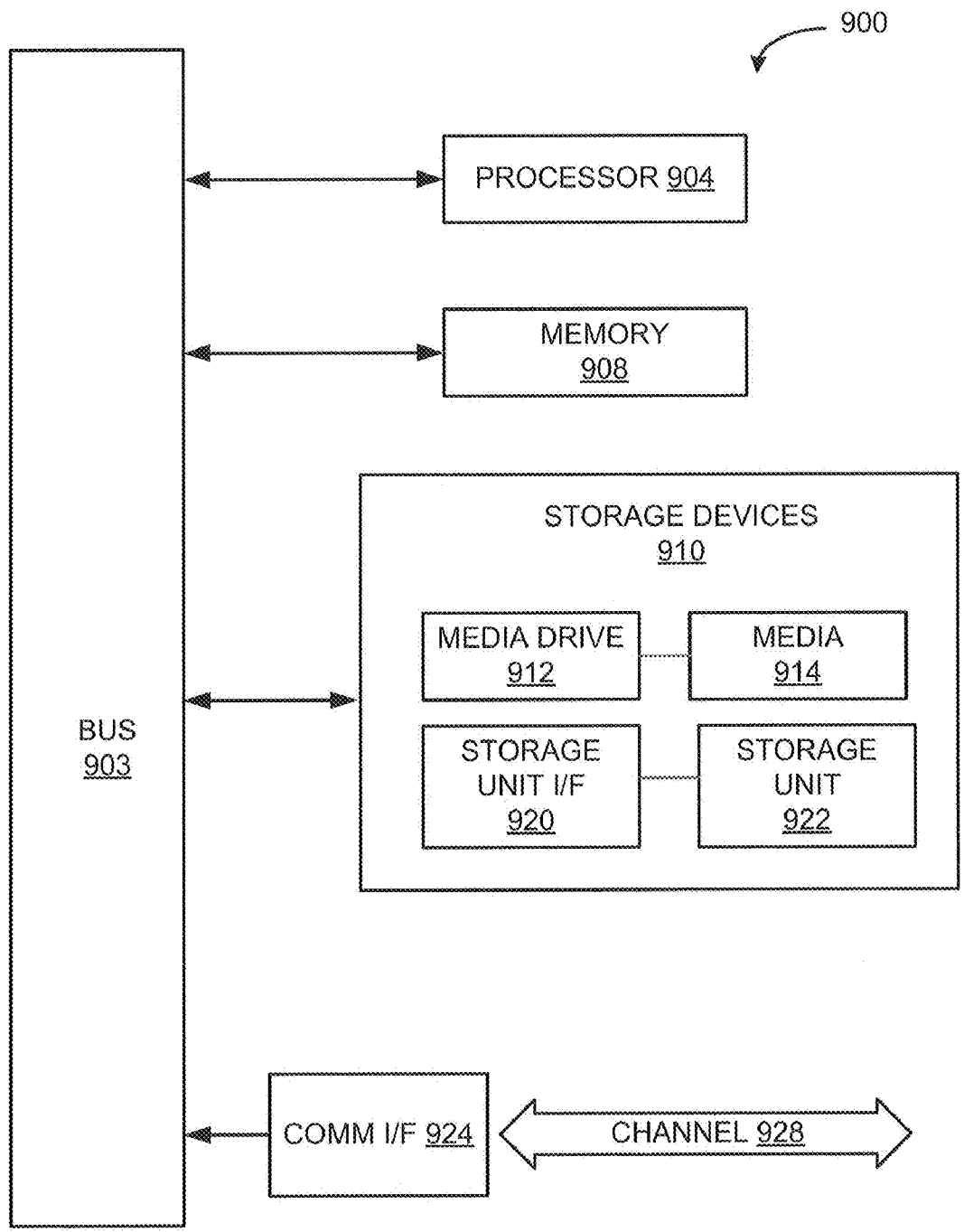
FIG. 9 is a diagram illustrating an example computing module in accordance with the systems and methods described herein.

In some embodiments, module 818 includes a lookup table that will be used for translation of decision-directed noise to true noise estimates as discussed above. The values are gathered over a large range of signal-to-noise ratios (between −30 to 40 dB). Note that although the low-end of signal-to-noise ratio values may sound irrelevant, the signal-to-noise ratio may severely degrade for some sub-carriers, in presence of large narrow band interferers.

Where components or modules of the invention are implemented in whole or in part using software, in one embodiment, these software elements can be implemented to operate with a computing or processing module capable of carrying out the functionality described with respect thereto. One such example-computing module is shown in FIG. 9. Various embodiments are described in terms of this example-computing module 900. After reading this description, it will become apparent to a person skilled in the relevant art how to implement the invention using other computing modules or architectures.

Referring now to FIG. 9, computing module 900 may represent, for example, computing or processing capabilities found within desktop, laptop or notebook computers; handheld computing devices (PDA's, smart phones, cell phones, palmtops, and other handheld computing devices); mainframes, supercomputers, workstations or servers; or any other type of special-purpose or general-purpose computing devices as may be desirable or appropriate for a given application or environment. Computing module 900 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 900 might include, for example, one or more processors, controllers, control modules, or other processing devices, such as a processor 904. Processor 904 might be implemented using a general-purpose or special-purpose processing engine such as, for example, a microprocessor, controller, or other control logic. In the example illustrated in FIG. 9, processor 904 is connected to a bus 902, although any communication medium can be used to facilitate interaction with other components of computing module 900 or to communicate externally.

Computing module 900 might also include one or more memory modules, simply referred to herein as main memory 908. For example, preferably random access memory (RAM) or other dynamic memory might be used for storing information and instructions to be executed by processor 904. Main memory 908 might also be used for storing temporary variables or other intermediate information during execution of instructions to be executed by processor 904. Computing module 900 might likewise include a read only memory ("ROM") or other static storage device coupled to bus 902 for storing static information and instructions for processor 904.

The computing module 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), or other removable or fixed media drive might be provided. Accordingly, storage media 914 might include, for example, a hard disk, a floppy disk, magnetic tape, cartridge, optical disk, a CD or DVD, or other fixed or removable medium that is read by, written to, or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing module 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory module) and memory slot, a PCMCIA slot and card, and other fixed or removable storage units 922 and interfaces 920 that allow software and data to be transferred from the storage unit 922 to computing module 900.

Computing module 900 might also include a communications interface 924. Communications interface 924 might be used to allow software and data to be transferred between computing module 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. These signals can deliver the software and data from memory or other storage medium in one computing system to memory or other storage medium in computing system 900. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 908, storage unit 920, and media 914. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 900 to perform features or functions of the present invention as discussed herein.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of generating an interference hypothesis indicating the presence of a predetermined level of interference in a communication signal having at least one channel estimation symbol, the method comprising:
   a) estimating a true noise variance using along-term data aided algorithm;
   b) estimating an interference variance using a short-term data aided algorithm; and
   c) determining an interference hypothesis based on comparing the true noise variance estimate and the interference variance estimate by:
      i) of the at least one channel estimation symbol;
      ii) verifying that the computed received signal power for a channel estimation symbol is within a predetermined threshold of another computed received signal power for another channel estimation symbol;
      iii) comparing the true noise variance estimate to the interference variance estimate; and
      iv) setting an interference hypothesis to indicate that interference is present if the computed received signal power for the channel estimation symbol is within the predetermined threshold and the true noise variance estimate is within a predetermined threshold of the interference variance estimate.

2. The method of claim 1, further comprising setting an initial indicator to indicate that interference is not present when at least one determined interference hypothesis indicates that interference is not present.

3. The method of claim 1, further comprising setting an interference indicator to indicate interference is present when two channel estimation symbols each contain one or more hypotheses indicating that interference is present.

4. The method of claim 1, further comprising changing an indicator from an interference state to a noninterference state based on a predetermined number of noninterference hypotheses.

5. The method of claim 1, further comprising changing an indicator from a noninterference state to an interference state based on a predetermined number of interference hypotheses.

6. A method of interference detection comprising:
   a) estimating a true noise variance using a long-term data aided algorithm;
   b) estimating an interference variance using a short-term data aided algorithm;
   c) determining a first interference hypothesis based on comparing the true noise variance estimate and the interference variance estimate by:
      i) computing a received signal power for at least one channel estimation symbol;
      ii) verifying that the computed received signal power for a channel estimation symbol of the at least one channel estimation symbol is within a predetermined of another computed received signal power for another channel symbol;
      iii) comparing the true noise variance estimate to the interference variance estimate; and
      iv) setting an interference hypothesis to indicate that interference is present if the computed received signal cower for the channel estimation symbol is within the predetermined threshold and the true noise variance estimate is within a predetermined threshold:
   d) determining a second interference hypothesis based on comparing true noise variance estimates and setting the second interference hypothesis to indicate that interference is present if an estimate of true noise variance using the short-term data aided algorithm is a predetermined threshold above the estimate of the true noise variance using the long-term data aided algorithm: and
   e) setting an initial decision to indicate that interference is present if both of the interference hypotheses indicate that interference is present.

7. The method of claim 6, further comprising setting an initial indicator to indicate that interference is not present when at least one determined interference hypothesis indicates that interference is not present.

8. The method of claim 6, further comprising setting an interference indicator to indicate interference is present when two channel estimation symbols each contain one or more hypotheses indicating that interference is present.

9. The method of claim 6, further comprising changing an indicator from an interference state to a noninterference state based on a predetermined number of noninterference hypotheses.

10. The method of claim 6, further comprising changing an indicator from a noninterference state to an interference state based on a predetermined number of interference hypotheses.

* * * * *